United States Patent [19]

Binversie et al.

[11] Patent Number: 5,195,914
[45] Date of Patent: Mar. 23, 1993

[54] TWO-STAGE TILT CYLINDER MECHANISM FOR MARINE PROPULSION STERN BRACKET ASSEMBLY

[75] Inventors: Gregory J. Binversie; David C. Calamia, both of Grayslake; David J. Hall, Zion, all of Ill.; H. Norman Petersen, Kenosha, Wis.

[73] Assignee: Outboard Marine Corporation, Waukegan, Ill.

[21] Appl. No.: 659,901

[22] Filed: Feb. 25, 1991

[51] Int. Cl.⁵ .............................................. B63H 21/26
[52] U.S. Cl. ................................. 440/56; 188/284; 440/61
[58] Field of Search ................ 440/56, 61, 53; 188/284

[56] References Cited

U.S. PATENT DOCUMENTS

| | | | |
|---|---|---|---|
| 949,654 | 2/1910 | Knapp | 188/284 |
| 1,150,925 | 8/1915 | Benner | 188/284 |
| 2,729,308 | 1/1956 | Koski et al. | 188/284 |
| 3,246,915 | 4/1966 | Alexander | 440/56 |
| 4,004,662 | 1/1977 | Sorgatz et al. | 188/284 |
| 4,325,700 | 4/1982 | Kern et al. | 440/61 |
| 4,551,104 | 11/1985 | Iwashita et al. | 440/56 |
| 4,575,342 | 3/1986 | Nakahama et al. | 440/56 |
| 5,024,301 | 6/1991 | Cook | 188/284 |

FOREIGN PATENT DOCUMENTS

| | | | |
|---|---|---|---|
| 193846 | 3/1967 | U.S.S.R. | 188/284 |
| 1411218 | 10/1975 | United Kingdom | 188/284 |

Primary Examiner—Sherman Basinger
Assistant Examiner—Thomas J. Brahan
Attorney, Agent, or Firm—Welsh & Katz, Ltd.

[57] ABSTRACT

A shock absorber adapted for use with the swivel bracket assembly of an outboard motor or the like, is disclosed, which swivel bracket assembly permits rotation of the motor to clear an underwater object if and when a boat strikes such an object. The shock absorber has a two stage operation in that it permits a swivel bracket assembly to rotate and provides a counterforce that is initially lower, and after some degree of rotation, preferably sufficient to have the drive shaft housing clear the object, provides a higher counterforce to continued rotation.

21 Claims, 2 Drawing Sheets

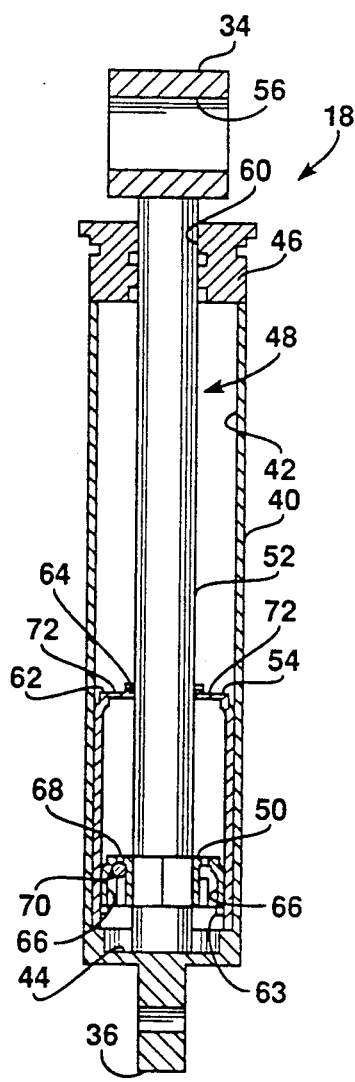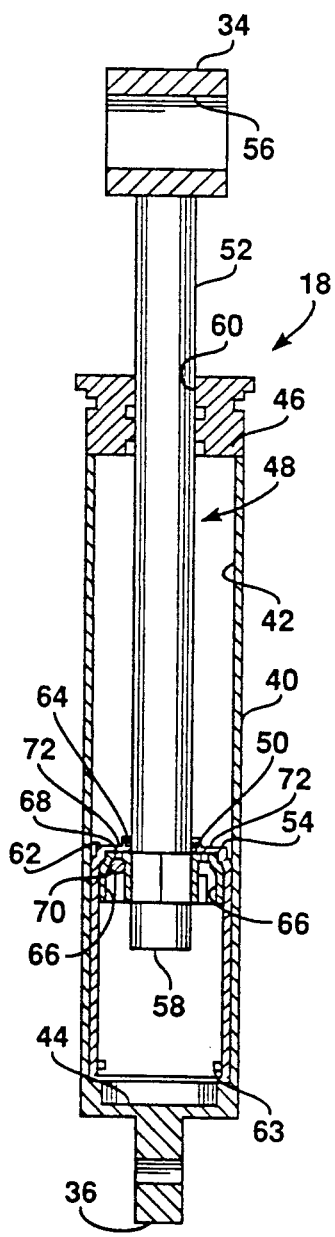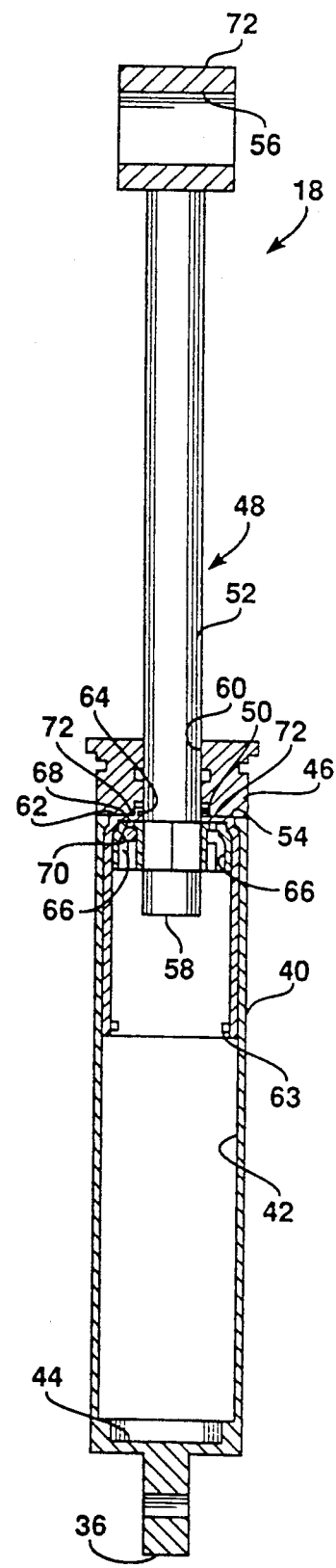

TWO-STAGE TILT CYLINDER MECHANISM FOR MARINE PROPULSION STERN BRACKET ASSEMBLY

The present invention generally relates to shock absorbing mechanisms, and more particularly relates to such a mechanism that is useful in connection with a stern and swivel bracket assembly of a marine propulsion unit to enable the unit to rotate upwardly when an underwater object, such as a log or the like, is struck during operation of a boat.

When a boat driven by an outboard motor strikes an underwater object, such as a log or the like, while operating at speed, high loads are imparted to the stern and swivel bracket assembly of the motor. The motor and the boat itself can be damaged if the stern and swivel bracket assembly of the motor is not designed to react in such a way to quickly relieve the high loads that are sustained by such an impact. The stern and swivel bracket assembly permit rotation of the outboard motor so that it can be elevated to pass over the object, and a shock absorber is generally provided as a component of the assembly. The shock absorber is provided to supply a counter force that maintains the motor in its desired position during normal operation. The counter force is of such magnitude to permit the rotation of the outboard engine so that the motor can clear the underwater object, but will not continue its rotation without restraint, which could also cause damage.

It is generally believed that the loads reach a maximum when the outboard motor begins to rotate up from the impact, while still in contact with the underwater object. At this point, the rotating part of the outboard is subjected to high loading from the shock absorber as well as impact loads caused by the object.

Many conventional shock absorbers have internal valving designs which provide a counter rotating force that is a function of only the speed of the internal piston of the absorber. While these types of absorbers are generally adequate in their operation, it is desirable to have a smaller initial counter force imparted by the absorber during the occurrence of the maximum loading, and a greater counter force thereafter. With such functionality, the potential for damage to the motor and stern and swivel bracket assembly is reduced.

Accordingly, it is a primary object of the present invention to provide an improved shock absorber for a swivel bracket assembly of an outboard motor which provides a varying counterforce that is functionally more compatible with the loads that are experienced from an impact with an underwater object.

It is another object of the present invention to provide such an improved shock absorber that has internal valving construction that provides a two stage operation, i.e., it has a lower counterforce during initial movement of its internal piston, and a higher counterforce during subsequent movement in the same direction. Stated in other words, it is an object of the present invention to provide such an improved shock absorber that has a soft counterforce during initial movement of the piston to permit easier rotation of the engine until it clears the object, and a hard counterforce during the remainder of the travel of the piston.

Yet another object of the present invention lies in the provision of easily proportioning the components of the improved shock absorber to determine the length of piston travel that will exert the lower counterforce relative to the higher counterforce, and thereby provide the lower counterforce through a predetermined amount of initial rotation of the motor.

These and other objects will become apparent upon reading the following detailed description of the present invention, while referring to the attached drawings, in which:

FIG. 3 is a cross sectional view of the two stage shock absorber embodying the present invention, and is shown in an unextended position;

FIG. 4 is a cross sectional view of the two stage shock absorber embodying the present invention, and is shown in a partially extended position, when it would be producing a lower counterforce; and, FIG. 5 is a cross sectional view of the two stage shock absorber embodying the present invention, and is shown in a totally extended position, when it would have produced a high counterforce.

DETAILED DESCRIPTION

Broadly stated, the present invention is directed to an improved shock absorber which is adapted for use with the swivel bracket assembly of an outboard motor or the like, which swivel bracket assembly permits rotation of the motor to clear an underwater object or the like if and when a boat strikes such an object. It should be understood that the shock absorber may also be useful with other types of marine propulsion units which are designed to have a drive shaft housing rotate upwardly upon such an impact.

The shock absorber has a two stage operation in that it permits a swivel bracket assembly to rotate and provides a counterforce that is initially lower, and after some degree of rotation, preferably sufficient to have the drive shaft housing clear the object, provides a higher counterforce to continued rotation.

Figure 1:
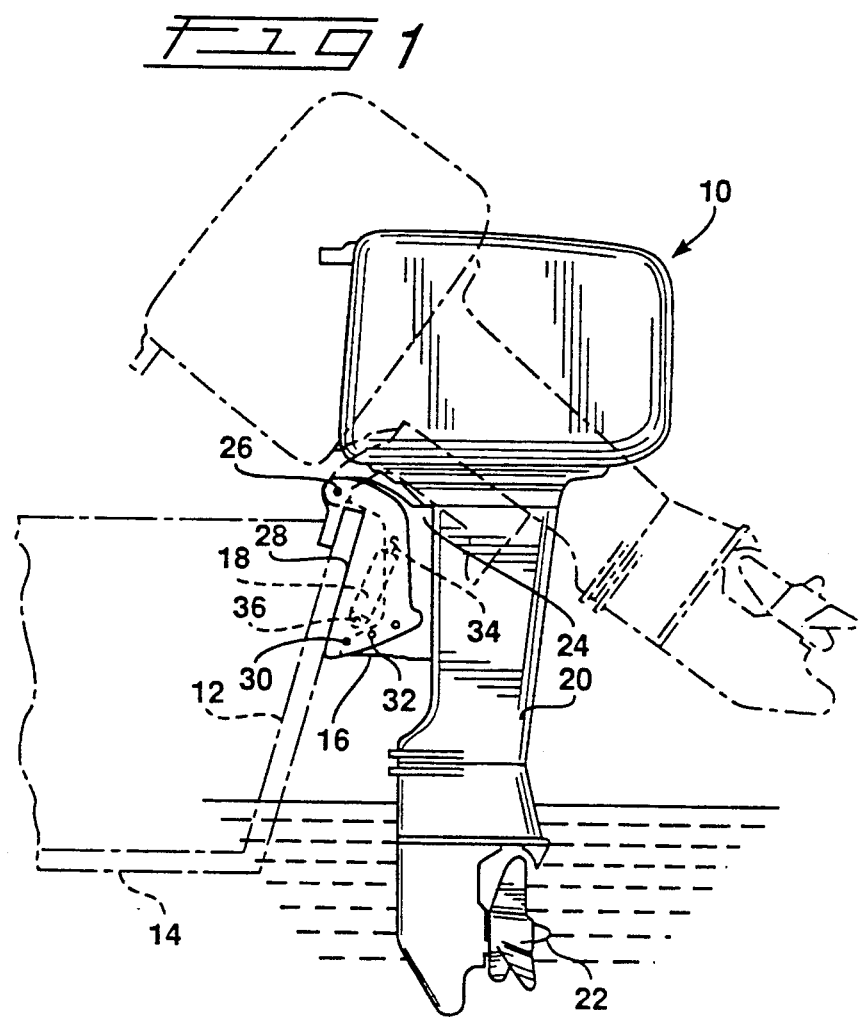
FIG. 1 is a side elevation of an outboard motor shown installed on the stern of a boat, with the outboard motor having a swivel bracket assembly and a shock absorber embodying the present invention.

Turning now to the drawings and particularly FIG. 1, an outboard motor 10 is shown installed on the transom 12 of a boat 14, with the outboard motor 10 having a swivel bracket assembly, indicated generally at 16, and a shock absorber 18 embodying the present invention is shown with the swivel bracket assembly 16. The motor 10 has a drive shaft housing 20 that has internal shafts and gearing to drive a propeller 22. In the position shown in solid lines the motor has the lower portion of the drive shaft housing immersed in the water so that the propeller can drive the boat. If the submerged portion of the motor strikes a log or other underwater object, the motor can rotate upwardly to approximately the position shown in phantom, by virtue of the operation of the swivel bracket assembly 16.

Figure 2:
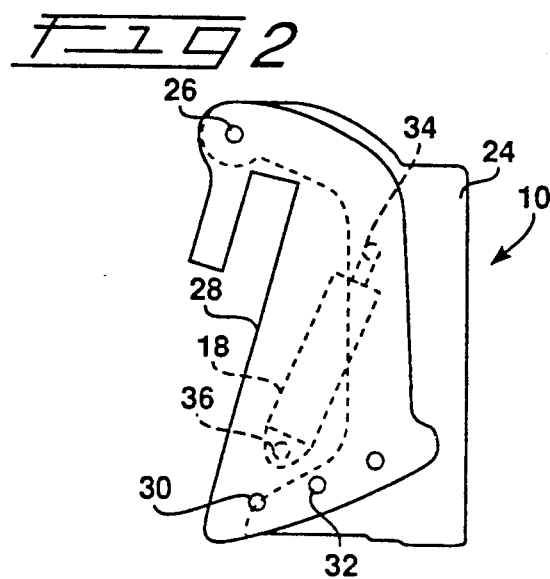
FIG. 2 is an enlarged side elevation of a swivel bracket assembly and shock absorber embodying the present invention.

Referring to FIG. 2, the swivel bracket assembly 16 generally comprises a swivel bracket 24 which is attached to the motor 10 and the swivel bracket 24 is attached to and rotatable around a pivot pin 26 which is carried by a mounting bracket 28 that clamps to the transom 12 of the boat. The orientation of the motor during normal operating can be adjusted by positioning a trim pin 30 on each side of the mounting bracket 28 in alternative apertures 32 located in the mounting bracket 28. The forward edge of the swivel bracket 24 bears against the trim pin during normal operation. The swivel bracket assembly also has the shock absorber 18 attached thereto, with an upper end 34 attached to the swivel bracket 24 and a lower trunnion 36 that is attached to the mounting bracket 28.

The shock absorber 18 embodying the present invention is shown in detail in the cross sectional plan views of FIGS. 3, 4 and 5, with FIG. 3 illustrating the shock absorber in a fully retracted position as would generally occur during normal operation, FIG. 4 illustrating the same in a partially extended position and FIG. 5 illustrating the same in a fully extended position. The shock absorber comprises a cylinder 40 having a cylindrical chamber 42, a lower end wall 44 to which the trunnion 36 is attached or integrally formed, an upper end wall 46, and a piston assembly 48.

The piston assembly 48 includes a cylindrical piston, an elongated piston rod 52 that is attached to the piston 50 and a cylindrical piston slider element 54. The upper end 34 of the shock absorber is in the form of a clevis having an aperture 56 through which a shaft can be inserted for attaching the clevis to the swivel bracket 24. The piston rod 52 also has a lower extension 58 which preferably bears against the lower end wall 44 when the shock absorber is in a retracted position.

In accordance with an important aspect of the present invention, and as shown in the FIGS. 3, 4 and 5, the piston 50 is vertically moveable (as shown in the drawings) within the piston slider element 54, and the slider element 54 is vertically moveable within the cylindrical bore 42. The outside diameter of the piston 50 is only slightly smaller than the inside diameter of the slider element 54 so that the piston can move within it, but is substantially in sealing contact. Similarly, the outside diameter of the slider element 54 is only slightly smaller than the inside diameter of the cylindrical bore 42 so that the slider element 54 can move within it, but is also in substantially sealing contact. Similarly, the upper end wall 46 has an aperture 60 which has an inside diameter only slightly larger than the diameter of the piston rod 52 so as to be substantially sealed. The slider element has an upper end wall 62 and it also has an aperture 64 that is only slightly larger than the diameter of the piston rod 52. Also, the side wall of the slider element 54 has an inwardly directed annular lip 63 located at the lower end portion thereof, which lip 63 is adapted to contact the piston 50 when the piston is moved downwardly.

The piston 50 has four large passages or ports 66, preferably equally spaced around the piston, that extend from the bottom surface to a point near the upper surface, and smaller apertures 68 extend from the passages 66 to the upper surface. There are balls 70 provided in preferably all but one of the passages 66 which define check valves, and biasing means (not shown) urge the balls 70 into seating engagement with the upper end of the larger passages 66. With respect to the one of the passages 66 which does not have a ball therein, this permits bidirectional flow through the passage, so that the piston assembly 48 can be slowly retracted to its normal operating position before upward rotation occurred. The preferably single passage which has no check valve permits slow return movement, but also does not significantly affect the desired two stage counterforce operation that has been described. Of course, it should also be understood that an external conduit means having comparable cross sectional area communicating the top and bottom of the chamber 42 may be employed. If this arrangement were employed, check valves could be provided for each of the passages 66.

The upper end wall 62 of the slider element 54 has preferably four apertures 72 that are concentric with the apertures 68 of the piston, but which are smaller in diameter, and which therefore further restrict the flow that would otherwise flow through the apertures 68. The piston 50 and slider element 54 are preferably provided with a tongue and groove construction so that the piston 50 and piston slider 54 cannot rotate relative to one another. This insures that the apertures 68 in the piston are maintained in concentric alignment with the apertures 72 of the slider element 54.

During operation, when the motor has struck an underwater object which would extend the shock absorber 18, the shock absorber would initially be in the position shown in FIG. 3. The shock absorber 18 is filled with hydraulic or similar fluid so that the cylindrical bore 42 and piston slider 54 are filled. Upon impact, the piston rod 52 will be pulled upwardly, and the piston will move upwardly in the slider element 54 with fluid being passed through the four apertures 68. The force of the fluid through the apertures 68 will be sufficient to move the balls 70 and permit upward movement of the piston 50 within the slider element 54. The movement of the piston within the slider element 54 will continue until the upper surface of the piston 50 contacts the upper end wall 62 of the slider element 54. When this contact occurs, the flow of fluid through the apertures 68 will be further restricted by the smaller apertures 72 of the upper end wall of the slider element 54, which will increase the resistance to upward movement. As the piston rod 52 moves from the position shown in FIG. 3 to the position shown in FIG. 4, the resistance to upward movement will be a function of the flow of hydraulic fluid through the apertures 68.

When the piston 50 reaches the position shown in FIG. 4, the apertures 68 will be in line with the apertures 72 of the slider element, which apertures 72 are smaller and the resistance to further movement will be a function of the size of the smaller apertures 72 which will be increased resistance. As the piston rod 52 is pulled upwardly, the piston will move the slider element 54 upwardly in the cylindrical bore 42 until it possibly reaches the position shown in FIG. 5. While the preferred embodiment illustrated in FIGS. 3, 4 and 5 have the apertures 68 aligned with the apertures 72 as previously described, it should be understood that such alignment is not absolutely required, so long as there is provided some way of providing fluid communication between the apertures 68 and apertures 72 when the piston 50 is in contact with the upper end wall 62 of the slider element 54. This can be in the form of lateral ports or grooves located in the upper surface of the piston 50, for example.

It should be understood that through the first stage of movement of the piston, i.e., from the position of FIG. 3 to that shown in FIG. 4, a soft or less counterforce to upward movement of the piston occurs, and during the course of travel from that shown in FIG. 4 to that shown in FIG. 5, a higher counterforce occurs, as is desired. It should also be appreciated that the length of travel of the piston during which the soft counterforce occurs is a function of the height of the slider element 54, this length can be varied to provide the length of travel during which the lesser counterforce is desired, and such length can be easily equated to the amount of rotation that is desired for the motor, in degrees.

From the foregoing description, it should be also be understood that an improved shock absorber has been illustrated and described which has many significant desirable advantages and attributes. It can be manufactured from approximately the same number of components as are used in some single stage shock absorbers, and yet produce the desired functionality of providing effective two stage operation.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. A shock absorber for a marine outboard drive of the type which has a swivel bracket assembly which permits rotational movement of the drive relative to a boat to which said swivel bracket assembly is adapted to be attached, said swivel bracket assembly having a swivel bracket attached to said marine drive and a mounting bracket adapted to be attached to the boat, the mounting bracket and swivel bracket being pivotable relative to one another, said shock absorber comprising:
   a cylinder having a cylinder inner bore adapted to receive fluid therein, a first end of the cylinder having an end wall with an aperture therein adapted to receive a rod means in generally sealing engagement, said cylinder having an end wall at the second end thereof and attachment means located at said second end, said attachment means being adapted to be connected to one of said mounting bracket and said swivel bracket;
   an elongated cylindrical slider element located within said cylinder and being slidable within said bore, said slider element having an end wall near the first end of said cylinder and a centered aperture in said end wall adapted to receive a rod means in generally sealing relation;
   a piston means having a rod means attached thereto, said piston means having an outer diameter in sliding engagement with the inner surface of said slider element, said rod means extending through said aperture in said slider element and through said cylinder first end wall and having an attachment means located at the outer end portion thereof adapted to be connected to the other of said mounting bracket and said swivel bracket;
   said piston means having a plurality of apertures of a first predetermined size located therein adapted to pass fluid from said bore to the interior of said slider element during movement of said piston means toward said first end of said cylinder;
   said slider element having a plurality of apertures in said end wall in fluid communication with the apertures of said piston means when said piston means is substantially in abutting relation with said end wall of said slider element, said apertures of said slider element being of a second predetermined size smaller than said first predetermined size.

2. A shock absorber as defined in claim 1 wherein said plurality of apertures in said piston means are substantially in line with said apertures in said slider element.

3. A shock absorber as defined in claim 2 wherein said plurality of apertures in said slider element and in said piston means comprises four apertures.

4. A shock absorber as defined in claim 1 wherein said attachment means of said rod means comprises a transversely oriented aperture located in the upper end thereof.

5. A shock absorber as defined in claim 1 wherein said attachment means of said of said cylinder comprises a trunnion having a transversely oriented aperture therein.

6. A shock absorber as defined in claim 1 wherein said piston means includes a plurality of passages communicating the interior of said slider element with said apertures in said piston means, said piston means also including a check valve in a predetermined number of said passages, each of said check valves being normally biased to resist fluid from passing from said slider element through said aperture in said piston means responsive to movement of said piston means toward said second end.

7. A shock absorber as defined in claim 6 wherein each of said check valves comprises a ball located within said port, and a spring biasing said ball toward said aperture.

8. A shock absorber as defined in claim 1 wherein said piston means includes an extension directed toward said second end of said cylinder, said extension being generally aligned with said rod means.

9. A shock absorber as defined in claim 8 wherein said cylinder has a reduced inside diameter adjacent the second end thereof defining an annular seat adjacent said second end.

10. A shock absorber as defined in claim 9 wherein said extension has a length that is sufficient to abut the second end wall when said slider element is seated against said annular wall of said cylinder.

11. A shock absorber as defined in claim 1 wherein said slider element includes an inwardly directed stop means adapted to contact said piston means so that movement of said piston means toward said second end of said cylinder will move said slider element toward said second end after said piston means comes in contact with said stop means.

12. A shock absorber as defined in claim 11 wherein said stop means comprises an inwardly radially directed lip attached to the side of said slider element.

13. A shock absorber for a marine drive of the type which has an assembly which permits movement of the drive relative to a boat to which the assembly is adapted to be attached, said assembly having a first mounting means attached to said marine drive and a second mounting means adapted to be attached to the boat, the first and second mounting means being pivotable relative to one another, said shock absorber comprising:
   a cylinder having a cylindrical inner bore adapted to receive fluid therein, a first end of the cylinder having an end wall with an aperture therein adapted to receive a rod means in generally sealing engagement, said cylinder having an end wall at the second end thereof and attachment means located at said second end, said attachment means being adapted to be connected to one of said first and second mounting means;
   an elongated cylindrical slider element moveable within said cylinder bore, said slider element having an end wall near the first end of said cylinder and a large aperture in said end wall adapted to receive a rod means in generally sealing relation;
   a piston means having a rod means attached thereto, said piston means having an outer diameter in sliding engagement with the inner surface of said slider element, said rod means extending through said aperture in said slider element and through said cylinder first end wall and having an attachment means located at the outer end portion thereof adapted to be connected to the other of said first and second mounting means;

said piston means having a plurality of apertures of a first predetermined size located therein adapted to pass fluid from said bore to the interior of said slider element during movement of said piston means toward said first end of said cylinder;

said slider element having a plurality of apertures in said end wall that are in fluid communication with the apertures of said piston means, said apertures of said slider element being of a second predetermined size that is smaller than said first predetermined size, said slider element having an inwardly directed stop means adapted to contact said piston means so that movement thereof toward said second end of said cylinder will move said slider element toward said second end after the piston means comes in contact with said stop means.

14. A shock absorber as defined in claim 13 wherein said stop means comprises an inwardly radially directed lip attached to the side of said slider element.

15. A shock absorber as defined in claim 13 wherein said plurality of apertures in said piston means comprises at least four apertures.

16. A shock absorber as defined in claim 13 wherein said plurality of apertures in said slider element comprises at least four apertures, said apertures in said slider element being generally aligned with the apertures in said piston means.

17. A shock absorber as defined in claim 13 wherein said attachment means of said rod means comprises a transversely oriented aperture located in the upper end thereof.

18. A shock absorber as defined in claim 13 wherein said attachment means of said of said cylinder comprises a trunnion having a transversely oriented aperture therein.

19. A shock absorber as defined in claim 13 wherein said piston means includes a plurality of enlarged passages terminating a small distance from the upper surface there of and communicating the interior of said slider element with said apertures in said piston means, said piston means also including a check valve in a predetermined number of said passages, each of said check valves being normally biased to resist fluid from passing from said slider element through said aperture in said piston means responsive to movement of said piston means toward said second end.

20. A shock absorber as defined in claim 19 wherein each of said check valves comprises a ball located within an associated port, and a spring biasing said ball toward said aperture in said piston means.

21. A shock absorber as defined in claim 19 wherein said predetermined number is at least one less than the number of apertures in said piston means.

* * * * *